United States Patent Office 3,435,031
Patented Mar. 25, 1969

3,435,031
NOVEL THIATRIAZINEDIOXIDES
Calvert W. Whitehead, Indianapolis, Ind., assignor to Eli Lilly and Company, Indianapolis, Ind., a corporation of Indiana
No Drawing. Filed Apr. 7, 1966, Ser. No. 540,850
Int. Cl. C07d 93/00
U.S. Cl. 260—242                4 Claims

ABSTRACT OF THE DISCLOSURE

Novel substituted 3,5-dioxotetrahydro-1,2,4,6-thiatriazine-1,1-dioxides, and methods of preparation thereof, useful as bactericides, fungicides, and fly repellents.

---

This invention relates to novel substituted thiatriazinedioxides and to methods for their preparation. More particularly, this invention relates to certain novel substituted 3,5-dioxotetrahydro-1,2,4,6-thiatriazine-1,1-dioxides having interesting activities as bactericides, soil and plant fungicides, and housefly repellents.

A primary object of this invention is to provide novel thiatriazinedionedioxides. Another object of this invention is to provide processes for the preparation of the novel compounds. These and other objects of the invention are more fully described hereinafter.

The novel thiatriazinedionedioxides of this invention are represented by the formula:

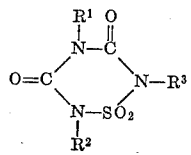

wherein:

$R^1$ and $R^2$ are $C_1$–$C_{12}$ alkyl, $C_3$–$C_6$ cycloalkyl, phenyl-($C_1$–$C_3$)alkyl, or phenyl, the same or different; and $R^3$ is hydrogen, $C_1$–$C_3$ alkyl, or $C_1$–$C_3$ alkanoylmethyl, an alkali metal, or an alkaline earth metal.

In this description, $C_1$–$C_{12}$ alkyl refers to branched or straight-chain alkyl containing from 1 to 12 carbons, and can be illustratively methyl, ethyl, n-propyl, isopropyl, n-butyl, isobutyl, sec.-butyl, tert.-butyl, isoamyl, sec.-amyl, tert.-amyl, n-amyl, n-hexyl, n-heptyl, n-octyl, sec.-hexyl, tert.-hexyl, sec.-octyl, sec.-nonyl, n-nonyl, n-decyl, n-undecyl, n-dodecyl, and the like.

$C_3$–$C_6$ cycloalkyl means saturated cyclic aliphatic hydrocarbon radicals having 3 to 6 carbons in the ring, i.e., cyclopropyl, cyclobutyl, cyclopentyl, and cyclohexyl.

Phenyl($C_1$–$C_3$)alkyl can be illustratively benzyl, 2-phenylethyl 2-phenylpropyl, or 3-phenylpropyl.

$C_1$–$C_3$ alkyl can be methyl, ethyl, n-propyl, or isopropyl.

$C_1$–$C_3$ alkanoylmethyl can be illustratively formylmethyl, acetylmethyl, or propionylmethyl.

The alkali metals can be illustratively sodium, potassium, and lithium.

The alkaline earth metals can be illustratively calcium, barium, zinc, and magnesium.

While the compounds of the present invention have been defined in terms of a structural formula which depicts the novel structural features of the claimed compounds and which indicates the presence therein of certain well-known organic radicals, including alkyl and phenyl, it will be recognized by those skilled in the art that such radicals may bear one or more substituents without departing in any way from the spirit of the invention and without altering the properties of the novel compounds in such a way as would set them apart from the invention or take them outside its scope. Compounds having the novel structure of the present invention and bearing such substituents are accordingly to be considered as equivalents of the unsubstituted compounds and are to be considered to lie within the scope of the invention. Among such substituent atoms and radicals are halo, hydroxy, nitro, lower alkyl, amino, trifluoromethyl, methoxy, methylmercapto, cyano, methylsulfonyl, β-hydroxyethyl, acetyl, and the like.

The following compounds are representative of the novel compounds of this invention:

2,4-di-n-amyl-3,5-dioxotetrahydro-1,2,4,6-thiatriazine-1,1-dioxide
2,4-di-n-amyl-3,5-dioxotetrahydro-1,2,4,6-thiatriazine-1,1-dioxide hemi-calcium salt
2,4-di-n-hexyl-3,5-dioxotetrahydro-1,2,4,6-thiatriazine-1,1-dioxide
2,4-di-n-nonyl-3,5-dioxotetrahydro-1,2,4,6-thiatriazine-1,1-dioxide sodium salt
2,4-di-n-undecyl-3,5-dioxotetrahydro-1,2,4,6-thiatriazine-1,1-dioxide
2,4-di-n-dodecyl-3,5-dioxotetrahydro-1,2,4,6-thiatriazine-1,1-dioxide
2,4-di-sec.-butyl-3,5-dioxotetrahydro-1,2,4,6-thiatriazine-1,1-dioxide hemi-zinc salt
2-ethyl-4-n-propyl-3,5-dioxotetrahydro-1,2,4,6-thiatriazine-1,1-dioxide
2-methyl-4-ethyl-6-ethyl-3,5-dioxotetrahydro-1,2,4,6-thiatriazine-1,1-dioxide
2-ethyl-4-phenyl-3,5-dioxotetrahydro-1,2,4,6-thiatriazine-1,1-dioxide hemi-barium salt
2-sec.-butyl-4-benzyl-3,5-dioxotetrahypdro-1,2,4,6-thiatriazine-1,1-dioxide
2-n-propyl-4-phenethyl-3,5-dioxotetrahydro-1,2,4,6-thiatriazine-1,1-dioxide potassium salt
2,4-di-n-butyl-6-ethyl-3,5-dioxotetrahydro-1,2,4,6-thiatriazine-1,1-dioxide
2,4-dibenzyl-6-methyl-3,5-dioxotetrahydro-1,2,4,6-thiatriazine-1,1-dioxide
2,4-di(3-phenylpropyl)-3,5-dioxotetrahydro-1,2,4,6-thiatriazine-1,1-dioxide, and the like.

The novel compounds of this invention are prepared by allowing a 1,3-disubstituted urea preferably dissolved in a suitable solvent such as dioxane, to react with chlorosulfonyl isocyanate. The reaction is exothermic. The reaction mixture is allowed to cool and stand overnight at ambient room temperature, and is then concentrated to dryness in vacuo. The solid residue is recrystallized from a suitable solvent to yield the thiatriazinedionedioxide.

The product compounds having $R^3$=hydrogen can be readily alkylated by preparation of the sodium salt of the thiatriazinedionedioxide (e.g., with sodium ethylate), which sodium salt is separated and allowed to react with an alkylating agent, such as ethyl bromide, or the like, to yield, for example, 2,4-dimethyl-6-ethyl-3,5-dioxotetrahydro-1,2,4,6-thiatriazine-1,1-dioxide.

That the invention may be more clearly understood, the following examples are included; but it is understood they are not intended to limit the scope thereof.

EXAMPLE 1

2,4-dimethyl-3,5-dioxotetrahydro-1,2,4,6-thiatriazine-1,1-dioxide

To a solution of 8.8 g. (0.10 mole) of 1,3-dimethylurea in 75 ml. of dry dioxane were added portionwise 14.1 g. (0.10 mole) of chlorosulfonyl isocyanate. The reaction was exothermic, and the reaction mixture was allowed to cool and stand overnight at ambient room temperature. The reaction product mixture was concentrated to dryness in vacuo and the solid residue recrystallized from benzene to yield 2,4-dimethyl-3,5-dioxotetrahydro-1,2,4,6-thiatriazine-1,1-dioxide as a solid having a melting point of about 185–186° C. Yield: 10.5 g.

Following the general procedure of Example 1 but using appropriate starting materials in the same molar quantities, the following compounds were prepared:

2,4 - diethyl - 3,5-dioxotetrahydro-1,2,4,6-thiatriazine-1,1-dioxide. Melting point: 147–148° C. Yield: 14 g.
2,4 - di - n - butyl-3,5-dioxotetrahydro-1,2,4,6-thiatriazine-1,1-dioxide. Melting point: 80–81° C. Yield: 15 g.
2,4 - di - n-heptyl-3,5-dioxotetrahydro-1,2,4,6-thiatriazine-1,1-dioxide. Melting point: 98° C. Yield: 8 g.
2,4 - dicyclohexyl - 3,5 - dioxotetrahydro-1,2,4,6-thiatriazine-1,1-dioxide. Melting point: 205° C. Yield: 6 g.
2,4 - diphenethyl - 3,5 - dioxotetrahydro - 1,2,4,6-thiatriazine-1,1-dioxide. Melting point: 174° C. Yield: 5 g.
2,4 - di - n - octyl-3,5-dioxotetrahydro-1,2,4,6-thiatriazine-1,1-dioxide. Melting point: 94° C. Yield: 5 g.
2,4 - diphenyl - 3,5 - dioxotetrahydro-1,2,4,6-thiatriazine-1,1-dioxide. Melting point: 204° C.(d.).

EXAMPLE 2

2,4-dicyclohexyl-6-methyl-3,5-dioxotetrahydro-1,2,4,6-thiatriazine-1,1-dioxide

To a stirred solution of 3 g. (0.01 mole) of 2,4-dicyclohexyl - 3,5 - dioxotetrahydro - 1,2,4,6 - thiatriazine-1,1-dioxide, 100 ml. of absolute ethanol, and 0.68 g. (0.01 mole) of sodium ethylate were added 1.42 g. (0.01 mole) of methyl iodide. After addition had been completed, stirring was continued for an hour at ambient room temperature. The reaction product mixture was concentrated in vacuo to dryness. The residue was extracted with petroleum ether and the extracts evaporated to yield a crystalline product identified as 2,4-dicyclohexyl-6-methyl-3,5-dioxotetrahydro-1,2,4,6-thiatriazine-1,1-dioxide. Melting point: 67° C. Yield: 2 g.

EXAMPLE 3

2,4-dimethyl-6-acetylmethyl-3,5-dioxotetrahydro-1,2,4,6-thiatriazine-1,1-dioxide A solution of 4 g. (0.0207 mole) of 2,4-dimethyl-3,5-dioxotetrahydro-1,2,4,6-thiatriazine-1,1-dioxide and 1.41 g. (0.0207 mole) of sodium ethylate was prepared in 100 ml. of absolute ethanol. In a few minutes, the sodium salt of 2,4 - dimethyl - 3,5 - dioxotetrahydro-1,2,4,6-thiatriazine-1,1-dioxide crystallized from the ethanol solution and was filtered off and dried. It weighed 3.5 g.

The sodium salt was mixed with 10 ml. of chloroacetone, stirred and heated under reflux for about 2 hours. A few milliliters of N,N-dimethylformamide were then added, and at the end of another hour, the reaction product mixture was poured onto ice and the solid precipitate taken up in ether. The ether solution was washed with distilled water, dried, and concentrated in vacuo to dryness. The solid residue was recrystallized from a mixture of ethyl acetate and petroleum ether to yield 2,4-dimethyl-6-acetylmethyl - 3,5 - dioxotetrahydro-1,2,4,6-thiatriazine-1,1-dioxide. Melting point: 90° C. Yield: 3 g., 75 percent of theory.

EXAMPLE 4

2,4-di-n-heptyl-3,5-dioxotetrahydro-1,2,4,6-thiatriazine-1,1-dioxide hemi-zinc salt To a solution of 1.8 g. of 2,4-di-n-heptyl-3,5-dioxotetrahydro-1,2,4,6-thiatriazine-1,1-dioxide in 50 ml. of ethanol was added a solution of 0.54 g. of zinc acetate in 25 ml. of ethanol, with swirling. The reaction product mixture was evaporated to dryness in vacuo and the residue flushed several times with additional portions of ethanol. The solid residue remaining after the final concentration was dried in vacuo at about 50° C. The product was identified by analysis as the 2,4-di-n-heptyl-3,5-dioxotetrahydro-1,2,4,6-thiatriazine-1,1-dioxide hemi-zinc salt. Yield: Quantitative.

I claim:
1. A compound of the formula:

$$\begin{array}{c} R^1 \quad O \\ | \quad \| \\ N-C \\ O=C \diagdown \quad \diagup N-R^3 \\ N-SO_2 \\ | \\ R^2 \end{array}$$

wherein
$R^1$ and $R^2$ are $[C_1-C_{12}]$ $C_5-C_{12}$ alkyl, $C_3-C_8$ cycloalkyl, phenyl $(C_1-C_3)$alkyl, or phenyl, the same or different; and
$R^3$ is hydrogen, $C_1-C_3$ alkyl, $C_1-C_3$ alkanoylmethyl, an alkali metal, or an alkaline earth metal.
2. A compound as in claim 1, said compound being 2,4-di-n-butyl - 3,5 - dioxotetrahydro-1,2,4,6-thiatriazine-1,1-dioxide.
3. A compound as in claim 1, said compound being 2,4-dicyclohexyl-6-methyl - 3,5 - dioxotetrahydro-1,2,4,6-thiatriazine-1,1-dioxide.
4. A compound as in claim 1, said compound being 2,4-di-n-heptyl - 3,5 - dioxotetrahydro-1,2,4,6-thiatriazine-1,1-dioxide hemi-zinc salt.

References Cited

UNITED STATES PATENTS 3,313,811   4/1967   Becke _____ 260—243

OTHER REFERENCES

Becke-Goehring et al., Naturwissenschaften, vol. 50, p. 353 (May 1963).
Appel et al., Chemische Berichte, vol. 91, pp. 1200–3 (1958).

HENRY R. JILES, *Primary Examiner.*

JOHN M. FORD, *Assistant Examiner.*

U.S. Cl. X.R.

260—243; 424—245, 246